US012717316B2

(12) United States Patent
Willison et al.

(10) Patent No.: US 12,717,316 B2
(45) Date of Patent: Aug. 25, 2026

(54) SYSTEMS AND METHODS FOR EVALUATING CONFIGURATION CHANGES ON A MACHINE IN A MANUFACTURING LINE

(71) Applicant: ATS Automation Tooling Systems Inc., Cambridge (CA)

(72) Inventors: Nicholas Willison, Cambridge (CA); Stanley Kleinikkink, Cambridge (CA)

(73) Assignee: ATS CORPORATION (CA)

(*) Notice: Subject to any disclaimer, the term of this patent is extended or adjusted under 35 U.S.C. 154(b) by 882 days.

(21) Appl. No.: 17/894,462

(22) Filed: Aug. 24, 2022

(65) Prior Publication Data

US 2023/0063452 A1 Mar. 2, 2023

Related U.S. Application Data

(60) Provisional application No. 63/237,788, filed on Aug. 27, 2021.

(51) Int. Cl.
*G05B 19/418* (2006.01)
*G05B 19/042* (2006.01)

(52) U.S. Cl.
CPC ..... *G05B 19/4188* (2013.01); *G05B 19/0428* (2013.01); *G05B 2219/15032* (2013.01); *G05B 2219/25074* (2013.01)

(58) Field of Classification Search
CPC .... G05B 19/05; G05B 19/052; G05B 19/056; G05B 19/058; G05B 19/418; G05B 19/4188

(Continued)

(56) References Cited

U.S. PATENT DOCUMENTS 8,069,374 B2 * 11/2011 Panigrahy ............... H04L 41/16 714/39
10,528,336 B2 * 1/2020 Arcese ...................... G06F 8/65
(Continued)

FOREIGN PATENT DOCUMENTS

EP 4141589 A1 * 3/2023 ......... G05B 19/0428
JP 7540233 B2 * 8/2024 ........... G05B 19/058

OTHER PUBLICATIONS

Extended European Search Report, European Patent Office (Munich, Germany), Jan. 9, 2023.

*Primary Examiner* — Crystal J Barnes-Bullock
(74) *Attorney, Agent, or Firm* — Valauskas Corder LLC

(57) ABSTRACT

Systems and methods for evaluating configuration changes on a machine in a manufacturing line are provided. The machine is controlled by a PLC that stores a plurality of parameters associated with the machine. The method involves operating one or more processors to: obtain, from the PLC, a plurality of first parameter values corresponding to the plurality of parameters stored at the PLC at a first time and a plurality of second parameter values corresponding to the plurality of parameters stored at the PLC at a second time; determine a plurality of parameter value differences; identify a plurality of configuration parameters from the plurality of parameters based on the plurality of parameter value differences, each configuration parameter corresponding to a user-manipulatable parameter associated with controlling the machine; and store a plurality of first configuration parameter values in association with a first timestamp corresponding to the first time.

20 Claims, 5 Drawing Sheets

(58) Field of Classification Search
USPC .......................................................... 700/96
See application file for complete search history.

(56) References Cited

U.S. PATENT DOCUMENTS

| | | | |
|---|---|---|---|
| 2017/0255723 | A1 | 9/2017 | Asenjo et al. |
| 2017/0357232 | A1 | 12/2017 | Nikhra et al. |

* cited by examiner

| Parameter | Value | Time |
|---|---|---|
| Temperature | 23 °C | 1/1/2021 12:01:01 |
| Humidity | 42 % | 1/1/2021 12:01:01 |
| Valve Flow Rate | 500 L/min | 1/1/2021 12:01:01 |
| Fill Time | 30 s | 1/1/2021 12:01:01 |
| Pressure Set Point | "High" | 1/1/2021 12:01:01 |
| ⋮ | ⋮ | ⋮ |
| Temperature | 23.2 °C | 1/1/2021 12:01:11 |
| Humidity | 40 % | 1/1/2021 12:01:11 |
| Valve Flow Rate | 500 L/min | 1/1/2021 12:01:11 |
| Fill Time | 30 s | 1/1/2021 12:01:11 |
| Pressure Set Point | "High" | 1/1/2021 12:01:11 |
| ⋮ | ⋮ | ⋮ |

| Configuration Parameter | Value | Time |
|---|---|---|
| Valve Flow Rate | 500 L/min | 1/1/2021 12:01:01 |
| Fill Time | 30 s | 1/1/2021 12:01:01 |
| Pressure Set Point | "High" | 1/1/2021 12:01:01 |
| ⋮ | ⋮ | ⋮ |
| Valve Flow Rate | 500 L/min | 1/1/2021 12:01:11 |
| Fill Time | 30 s | 1/1/2021 12:01:11 |
| Pressure Set Point | "High" | 1/1/2021 12:01:11 |
| ⋮ | ⋮ | ⋮ |
| Valve Flow Rate | 500 L/min | 1/5/2021 14:05:01 |
| Fill Time | 45 s | 1/5/2021 14:05:01 |
| Pressure Set Point | "High" | 1/5/2021 14:05:01 |
| ⋮ | ⋮ | ⋮ |

SYSTEMS AND METHODS FOR EVALUATING CONFIGURATION CHANGES ON A MACHINE IN A MANUFACTURING LINE

CROSS-REFERENCE TO RELATED APPLICATION

This application claims the benefit of U.S. Provisional Patent Application No. 63/237,788 filed on Aug. 27, 2021. The entire contents of U.S. Provisional Patent Application No. 63/237,788 is hereby incorporated by reference for all purposes.

FIELD

The described embodiments generally relate to manufacturing lines, and, in particular, to evaluating configuration changes on machines in manufacturing lines.

BACKGROUND

The following is not an admission that anything discussed below is part of the prior art or part of the common general knowledge of a person skilled in the art.

A manufacturing line typically includes a plurality of machines that successively process workpieces to produce finished articles. In many cases, the machines are controlled by industrial computers known as programmable logic controllers (PLCs).

PLCs are ruggedized computers that utilize specialized hardware to provide high reliability in industrial settings. To control a machine in a manufacturing line, a PLC executes programmed instructions, or software. The PLC software stores a plurality of values as parameters (also known as variables or tags) that can be referenced or manipulated by the software. A PLC may use hundreds, thousands, or even millions of parameters during operation.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for evaluating configuration changes on a machine in a manufacturing line. The machine is controlled by a programmable logic controller (PLC). The PLC stores a plurality of parameters associated with the machine. The method involves operating one or more processors to: obtain, from the PLC, a plurality of first parameter values corresponding to the plurality of parameters stored at the PLC at a first time; obtain, from the PLC, a plurality of second parameter values corresponding to the plurality of parameters stored at the PLC at a second time; determine a plurality of parameter value differences, the plurality of parameter value differences comprising, for each parameter, a difference between the first and second parameter values corresponding to that parameter; identify a plurality of configuration parameters from the plurality of parameters based on the plurality of parameter value differences, each configuration parameter corresponding to a user-manipulatable parameter associated with controlling the machine; and store a plurality of first configuration parameter values in association with a first timestamp corresponding to the first time, the plurality of first configuration parameter values comprising, for each configuration parameter, a corresponding first parameter value.

In some embodiments, identifying the plurality of configuration parameters can involve: identifying a plurality of parameter value differences less than a predetermined difference threshold; and identifying a plurality of parameters corresponding to the parameter value differences less than the predetermined difference threshold as the plurality of configuration parameters.

In some embodiments, the method can further involve operating the one or more processors to identify a plurality of environmental parameters from the plurality of parameters based on the plurality of parameter value differences, each environmental parameter corresponding to a non-user-manipulatable parameter associated with monitoring the machine.

In some embodiments, the method can further involve operating the one or more processors to: generate a first hash based on the plurality of first configuration parameter values; and store the first hash in association with the first timestamp.

In some embodiments, the method can further involve operating the one or more processors to: obtain, from the PLC, a plurality of third parameter values corresponding to the plurality of parameters stored at the PLC at a third time; and store a plurality of third configuration parameter values in association with a third timestamp corresponding to the third time, the plurality of third configuration parameter values comprising, for each configuration parameter, a corresponding third parameter value.

In some embodiments, the method can further involve operating the one or more processors to determine one or more configuration parameter value differences between corresponding configuration parameter values in the plurality of first configuration parameter values and the plurality of third configuration parameter values.

In some embodiments, the method can further involve operating the one or more processors to in response to determining the one or more configuration parameter value differences, generate an alert indicating the one or more configuration parameter value differences.

In some embodiments, the method can further involve operating the one or more processors to in response to determining the one or more configuration parameter value differences, modify a value of one or more parameters stored at the PLC based on the plurality of first configuration parameter values.

In some embodiments, the method can further involve operating the one or more processors to determine, using one or more machine learned models, a predicted performance change of the machine based on one or more of the plurality of first configuration parameter values.

In some embodiments, the method can further involve operating the one or more processors to modify a value of one or more parameters stored at the PLC based on the predicted performance change.

In some embodiments, the method can further involve operating the one or more processors to train one or more machine learned models based on performance data associated with one or more of the plurality of first configuration parameter values and at least one of the machine or the manufacturing line.

In some embodiments, the plurality of second parameter values can be obtained from the PLC subsequent to obtaining the plurality of first parameter values.

In accordance with another broad aspect, there is provided a non-transitory computer readable medium having instructions stored thereon executable by one or more processors to implement the method.

In accordance with another broad aspect, there is provided a system for evaluating configuration changes on a machine in a manufacturing line. The machine is controlled by a programmable logic controller (PLC). The PLC stores a plurality of parameters associated with the machine. The system includes: one or more storage devices and one or more processors. The one or more processors are in electronic communication with the PLC and the one or more storage devices. The one or more processors are operable to: obtain, from the PLC, a plurality of first parameter values corresponding to the plurality of parameters stored at the PLC at a first time; obtain, from the PLC, a plurality of second parameter values corresponding to the plurality of parameters stored at the PLC at a second time; determine a plurality of parameter value differences, the plurality of parameter value differences comprising, for each parameter, a difference between the first and second parameter values corresponding to that parameter; identify a plurality of configuration parameters from the plurality of parameters based on the plurality of parameter value differences, each configuration parameter corresponding to a user-manipulatable parameter associated with controlling the machine; and store, at the one or more storage devices, a plurality of first configuration parameter values in association with a first timestamp corresponding to the first time, the plurality of first configuration parameter values comprising, for each configuration parameter, a corresponding first parameter value.

In some embodiments, identifying the plurality of configuration parameters can involve: identifying a plurality of parameter value differences less than a predetermined difference threshold; and identifying a plurality of parameters corresponding to the parameter value differences less than the predetermined difference threshold as the plurality of configuration parameters.

In some embodiments, the one or more processors can be further operable to identify a plurality of environmental parameters from the plurality of parameters based on the plurality of parameter value differences, each environmental parameter corresponding to a non-user-manipulatable parameter associated with monitoring the machine.

In some embodiments, the one or more processors can be further operable to: generate a first hash based on the plurality of first configuration parameter values; and store, at the one or more storage devices, the first hash in association with the first timestamp.

In some embodiments, the one or more processors can be further operable to: obtain, from the PLC, a plurality of third parameter values corresponding to the plurality of parameters stored at the PLC at a third time; and store, at the one or more storage devices, a plurality of third configuration parameter values in association with a third timestamp corresponding to the third time, the plurality of third configuration parameter values comprising, for each configuration parameter, a corresponding third parameter value.

In some embodiments, the one or more processors can be further operable to determine one or more configuration parameter value differences between corresponding configuration parameter values in the plurality of first configuration parameter values and the plurality of third configuration parameter values.

In some embodiments, the one or more processors can be further operable to in response to determining the one or more configuration parameter value differences, generate an alert indicating the one or more configuration parameter value differences.

In some embodiments, the one or more processors may be further operable to in response to determining the one or more configuration parameter value differences, modify a value of one or more parameters stored at the PLC based on the plurality of first configuration parameter values.

In some embodiments, the one or more processors can be further operable to determine, using one or more machine learned models, a predicted performance change of the machine based on one or more of the plurality of first configuration parameter values.

In some embodiments, the one or more processors can be further operable to modify a value of one or more parameters stored at the PLC based on the predicted performance change.

In some embodiments, the one or more processors can be further operable to train one or more machine learned models based on performance data associated with one or more of the plurality of first configuration parameter values and at least one of the machine or the manufacturing line.

In some embodiments, the plurality of second parameter values can be obtained from the PLC subsequent to obtaining the plurality of first parameter values.

BRIEF DESCRIPTION OF THE DRAWINGS

Several embodiments will be described in detail with reference to the drawings, in which.

Figure 1:
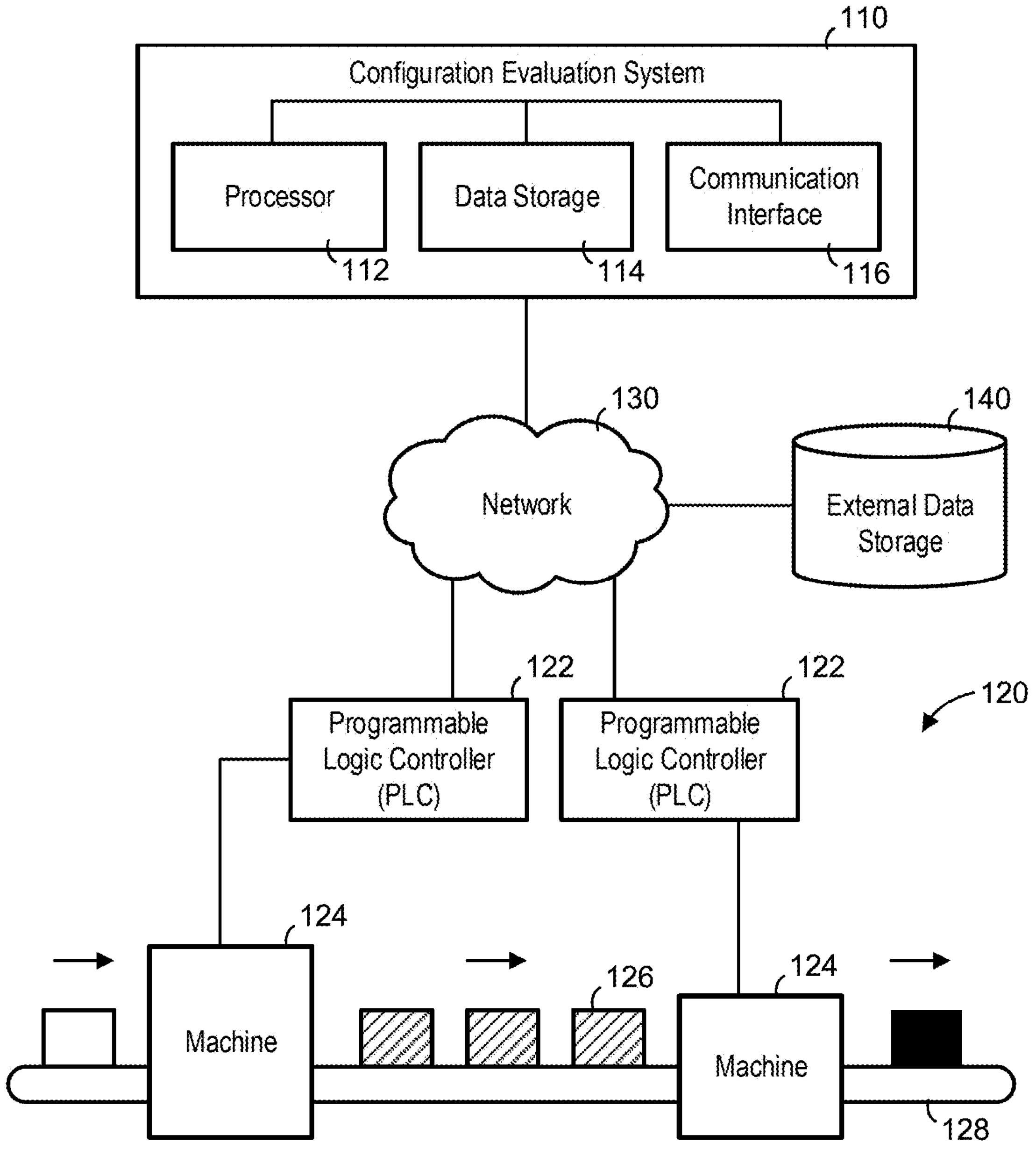
FIG. 1 is a block diagram of components interacting with an example system for evaluating configuration changes on a machine in a manufacturing line, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring now to FIG. 1, there is shown an example system 110 for evaluating configuration changes on a machine 124 in a manufacturing line 120. In general, the manufacturing line 120 can be any type of production line for manufacturing, producing, assembling, or processing workpieces 126. For example, the manufacturing line 120 can be configured to produce engine parts, medical devices, electronics, or any other articles. As shown, the manufacturing line 120 can include a plurality of machines 124 that are positioned along the manufacturing line 120 and configured to perform specific processing tasks on the workpieces 126. During operation, the workpieces 126 can be transported along the manufacturing line 120 and successively processed by the machines 124 until a finished article is produced. As shown, the manufacturing line 120 may include a conveying mechanism 128 operable to transport the workpieces 126 along the manufacturing line 120, such as a conveyor. The particular arrangement and configuration of the manufacturing line 120 may depend on the type of the workpiece 126 being manufactured, produced, assembled, or processed.

The machines 124 in the manufacturing line 120 can be controlled by one or more programmable logic controllers (PLCs) 122. Each PLC 122 can control one or more machines 124. A PLC 122 is a ruggedized computer that generally includes a processor, memory, and communication interface (not shown). To control a machine 124, a PLC 122 executes, using the processor, programmed instructions or software stored in the memory. During operation, the PLC 122 stores a plurality of values as parameters (also known as variables or tags) that can be referenced or manipulated by the software. Various parameters associated with the machine 124 controlled by the PLC 122 can be stored at the PLC 122. For example, for a leak test machine, a PLC 122 may store various parameters associated with the flow rate, fill time, pressure set point, temperature, humidity, etc. A PLC 122 may use hundreds, thousands, or even millions of parameters during operation. It may be useful to track or monitor some of these parameters to evaluate the machines 124 or the manufacturing line 120. However, the large number of parameters may make it difficult to do so using conventional systems.

The configuration evaluation system 110 can obtain parameter values from a PLC 122 and identify configuration parameters from the plurality of parameters stored at the PLC 122. The configuration parameters generally correspond to a subset of user-manipulatable parameters associated with controlling a machine 124. The configuration parameters can be modified by a manufacturing line operator or programmer to modify the configuration or operation of the machine 124. For example, for a leak test machine, the configuration parameters may include the flow rate, fill time, pressure set point, etc. The configuration parameters generally do not include non-user-manipulatable parameters, such as those corresponding to environmental conditions, output of the machine 124, etc., which can make up a substantial portion of the total number of parameters. By identifying the configuration parameters, the configuration evaluation system 110 can track a smaller subset of the large number of parameters stored at the PLCs 122. This can greatly reduce the amount of computer resources used to store and evaluate parameters, and therefore improve the overall functioning of the configuration evaluation system 110. The configuration evaluation system 110 can obtain the parameter values from the PLCs 122 in various ways. For example, the configuration evaluation system 110 may obtain the parameter values on a periodic basis, automatically, intermittently, regularly, constantly, etc.

The configuration evaluation system 110 can use the obtained configuration parameter values in a variety of ways. For example, the configuration evaluation system 110 can store a timestamped record of configuration parameter values. The timestamped record can be used as a timeline to audit or detect changes in the configuration parameters, to correlate changes in the performance of the machines 124 to changes in the configuration parameters, to roll back or revert configuration parameters at a PLC 122, or to apply different configuration parameter at the PLC 122. In some cases, additional identifiers can be associated with the timestamped configuration parameter values. For example, in some cases, the configuration parameter values can be associated with various indicators associated with the status of the machine 124, such as "in service", "out of service", "testing", etc. The configuration evaluation system 110 can also use the configuration parameter values to predict changes in the performance of the machines 124 or the manufacturing line 120 using machine learned models, or train machine learning models to make similar predictions. In some cases, the predictions can be used for root cause analyses, for example, to correlate changes in the quality or output of the manufacturing line 120 to changes to the parameters at a PLC 122.

The configuration evaluation system 110 can be implemented using hardware, software, or a combination of hardware and software. For example, the configuration evaluation system 110 may be implemented using an electronic tablet device, a personal computer, workstation, server, portable computer, mobile device, personal digital assistant, laptop, smart phone, WAP phone, or any combination of these. In some embodiments, the configuration evaluation system 110 may be provided by two or more computers distributed over a wide geographic area and connected through a network. As shown, the configuration evaluation system 110 can include a processor 112, a data storage 114, and a communication interface 116. Each of these components may be divided into additional components or combined into fewer components. In some cases, one or more of the components may be distributed over a wide geographic area.

The processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the configuration evaluation system 110. The processor 112 can include more than one processor with each processor being configured to perform different dedicated tasks. The processor 112 can execute various instructions stored in the data storage 114 to implement the various configuration evaluation methods described herein.

The data storage 114 can include RAM, ROM, one or more hard drives, one or more flash drives or some other suitable data storage elements such as disk drives. The data storage 114 can store various data collected from the PLCs 122, such as parameter values. The data storage 114 can also store instructions that can be executed by the processor 112 to implement the various configuration evaluation methods described herein. In some embodiments, the data storage 114 may include more than one data storage component. For example, the data storage 114 may include a local data storage located at the configuration evaluation system 110 and an external data storage that is remote from the local data storage and connected to the configuration evaluation system 110 over a network.

The communication interface 116 can include any interface that enables the configuration evaluation system 110 to communicate with various devices and other systems. The communication interface 116 can include at least one of a serial port, a parallel port or a USB port, in some embodiments. The communication interface 116 may also include an interface to a component via one or more of a Bluetooth, WIFI, Internet, Local Area Network (LAN), Ethernet, Firewire, modem, fiber, or digital subscriber line connection. Various combinations of these elements may be incorporated within the communication interface 116. The communication interface 116 can be used to communicate with the PLCs 122, for example, to obtain parameter values.

The configuration evaluation system 110 can communicate with the PLCs 122 and other components, such as an external data storage 140, through a network 130. The network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the various components. In various embodiments, the configuration evaluation system 110 can communicate with the PLCs 122 using the Open Platform Communications (OPC) standards, including OPC Data Access (OPC DA) or IOC Unified Architecture (OPC UA).

The external data storage 140 can store various data associated with the operation of the configuration evaluation system 110, similar to the data storage 114. For example, various configuration parameter values may be stored on the external data storage 140 for retrieval by the configuration evaluation system 110. In some embodiments, the external data storage 140 may store older, or less frequently used data as compared the data storage 114.

Figure 2:
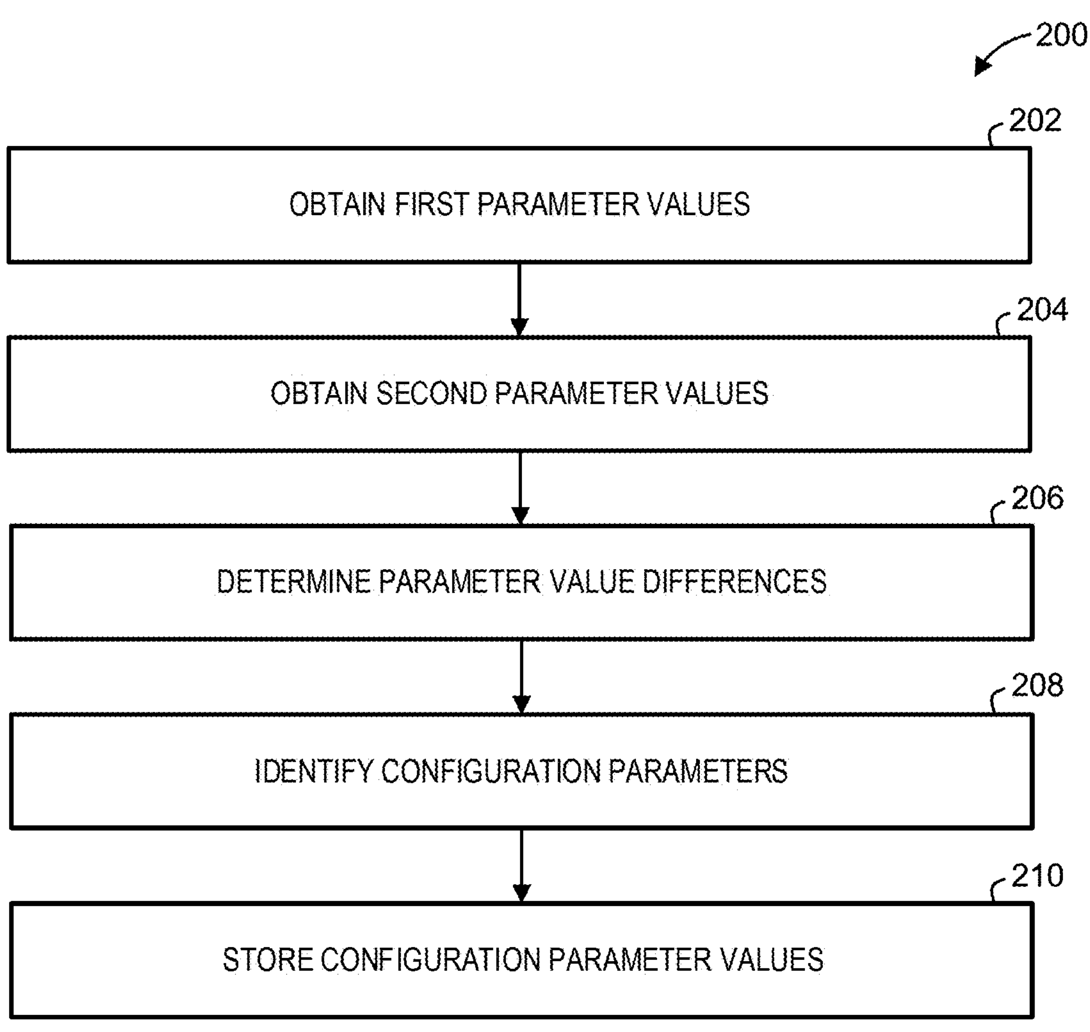
FIG. 2 is flowchart of an example method of operating the configuration evaluation system shown in FIG. 1, in accordance with an embodiment.

Referring now to FIG. 2, there is shown an example method 200 for operating the configuration evaluation system 110. The method 200 can be used to evaluate configuration changes on a machine 124 in the manufacturing line 120 based on parameters associated with the machine 124 that are stored at the PLC 122 that controls the machine 124.

Figure 3:
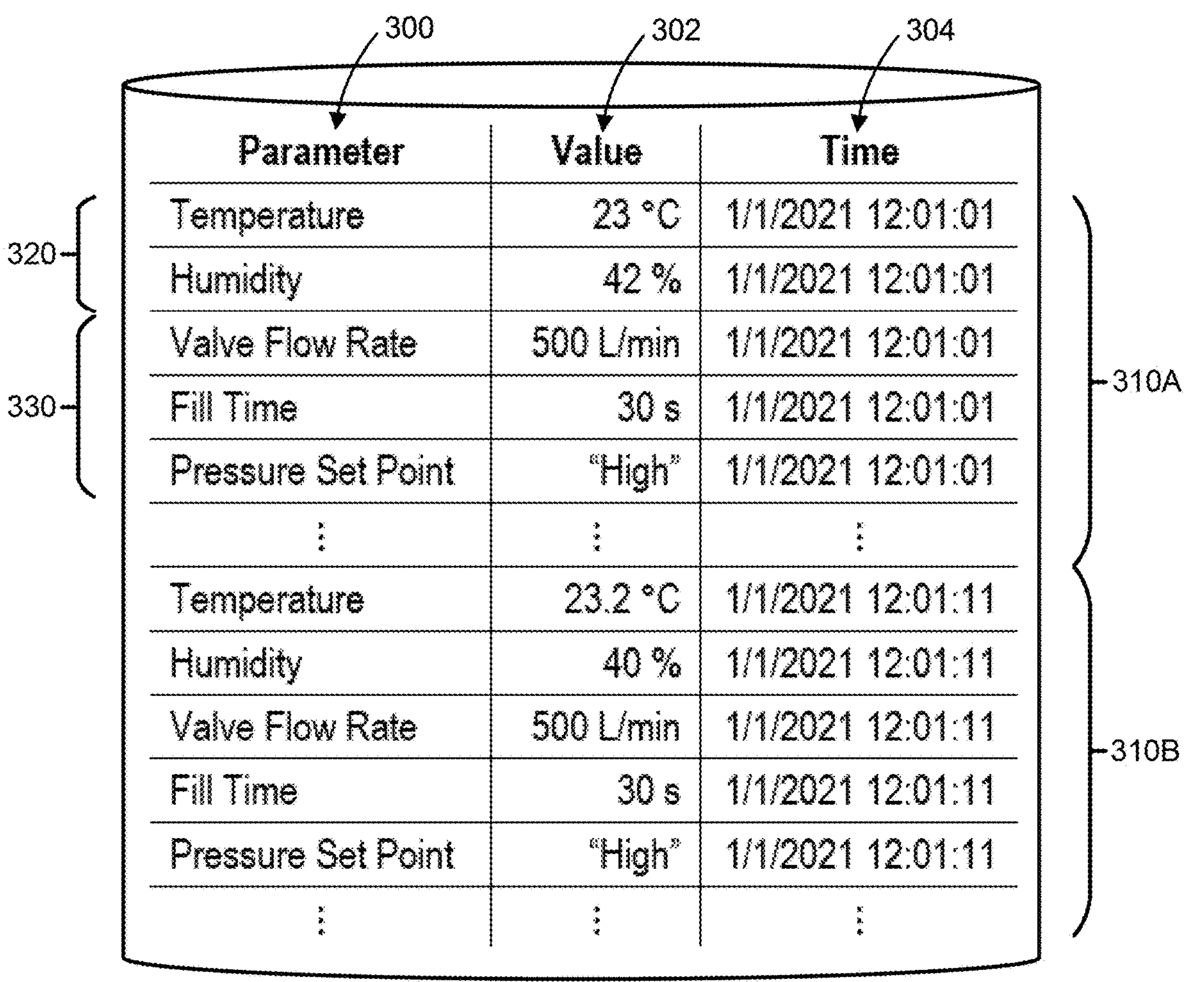
FIG. 3 is table of example parameter values that can be obtained from a PLC using the configuration evaluation system shown in FIG. 1, in accordance with an embodiment.

At 202, the processor 112 can obtain a plurality of first parameter values from the PLC 122. The plurality of first parameter values can correspond to a plurality of parameters stored at the PLC 122 at a first time. For example, FIG. 3 shows a plurality of parameters 300 that can be stored at and obtained from a PLC 122. In the illustrated example, the parameters 300 include temperature, humidity, valve flow rate, fill time, and pressure set point. However, it should be appreciated that there may be various additional parameters. At a given time 304, each parameter 300 has a value 302. For example, at 1/1/2021 12:01:01, the temperature parameter has a value of 23° C. As shown, a plurality of first parameter values 310A corresponding to a first time 1/1/2021 12:01:01 can be obtained from the PLC 122. As shown, the parameter values 302 can be numerical or non-numerical.

At 204, the processor 112 can obtain a plurality of second parameter values from the PLC 122. The plurality of second parameter values can correspond to the plurality of parameters stored at the PLC 122 at a second time. For example, FIG. 3 shows a plurality of second parameter values 310B corresponding to a second time 1/1/2021 12:01:11 that can be obtained from the PLC 122. As shown, the second time can be subsequent to the first time. In some embodiments, the processor 112 can obtain the plurality of second parameter values 310B from the PLC 122 subsequent to obtaining the plurality of first parameter values 310A. In other embodiments, the processor 112 can obtain the first and second parameter values 310A, 3106 simultaneously.

At 206, the processor 112 can determine a plurality of parameter value differences. The plurality of parameter value differences can include, for each parameter 300, a difference between the first and second parameter values 310A, 310B (i.e., obtained at 202 and 204) corresponding to that parameter. In other words, each parameter value difference can correspond to the change in value 302 of a parameter between the first and second times. For instance, in the example illustrated in FIG. 3, the parameter value differences can include a temperature parameter value difference (i.e., 23.2−23=0.2° C.), a humidity parameter value difference (i.e., 40−42=−2%), a valve flow rate parameter value difference (i.e., 500−500=0 L/min), a fill time parameter value difference (30−30=0 s), and a pressure set point parameter value difference (no change).

At 208, the processor 112 can identify a plurality of configuration parameters from the plurality of parameters 300. Each configuration parameter can correspond to a user-manipulatable parameter associated with controlling the machine 124 that is controlled by the PLC 122. The processor 112 can identify the plurality of configuration parameters based on the plurality of parameter value differences (i.e., determined at 206). Typically, configuration parameter values will change infrequently because a user is unlikely to change the parameter over a relatively small period of time. In contrast, other non-configuration parameters, such as those related to environmental conditions and output of the machine 124, can change frequently, even over small periods of time. The processor 112 can therefore use the parameter value differences to detect changes in the parameter values 302 and identify configuration parameters. For example, continuing with the example illustrated in FIG. 3, the processor 112 can determine that the valve flow rate, fill time, and pressure set point parameters are configuration parameters 330 because the parameter value differences for these parameters is zero. That is, the valve flow rate, fill time, and pressure set point parameter values at the first and second times are the same.

In some embodiments, in a similar manner, the processor 112 can also identify a plurality of non-configuration parameters that correspond to non-user-manipulatable parameters associated with monitoring the machine 124, such as environmental parameters. For example, continuing with the example illustrated in FIG. 3, the processor 112 can determine that the temperature and humidity parameters are non-configuration parameters 320 because the parameter value differences for these parameters is non-zero. That is, the temperature and humidity parameter values at the first and second times are different.

In some embodiments, the processor 112 can identify a plurality of parameter value differences that are less than a predetermined difference threshold as the plurality of configuration parameters. The threshold may be different for different parameters 300, or the same for multiple parameters 300. The threshold may also depend on the time elapsed between the first and second times. In some embodiments, the processor 112 can use a machine-learned model to identify the configuration parameters.

Figure 4:
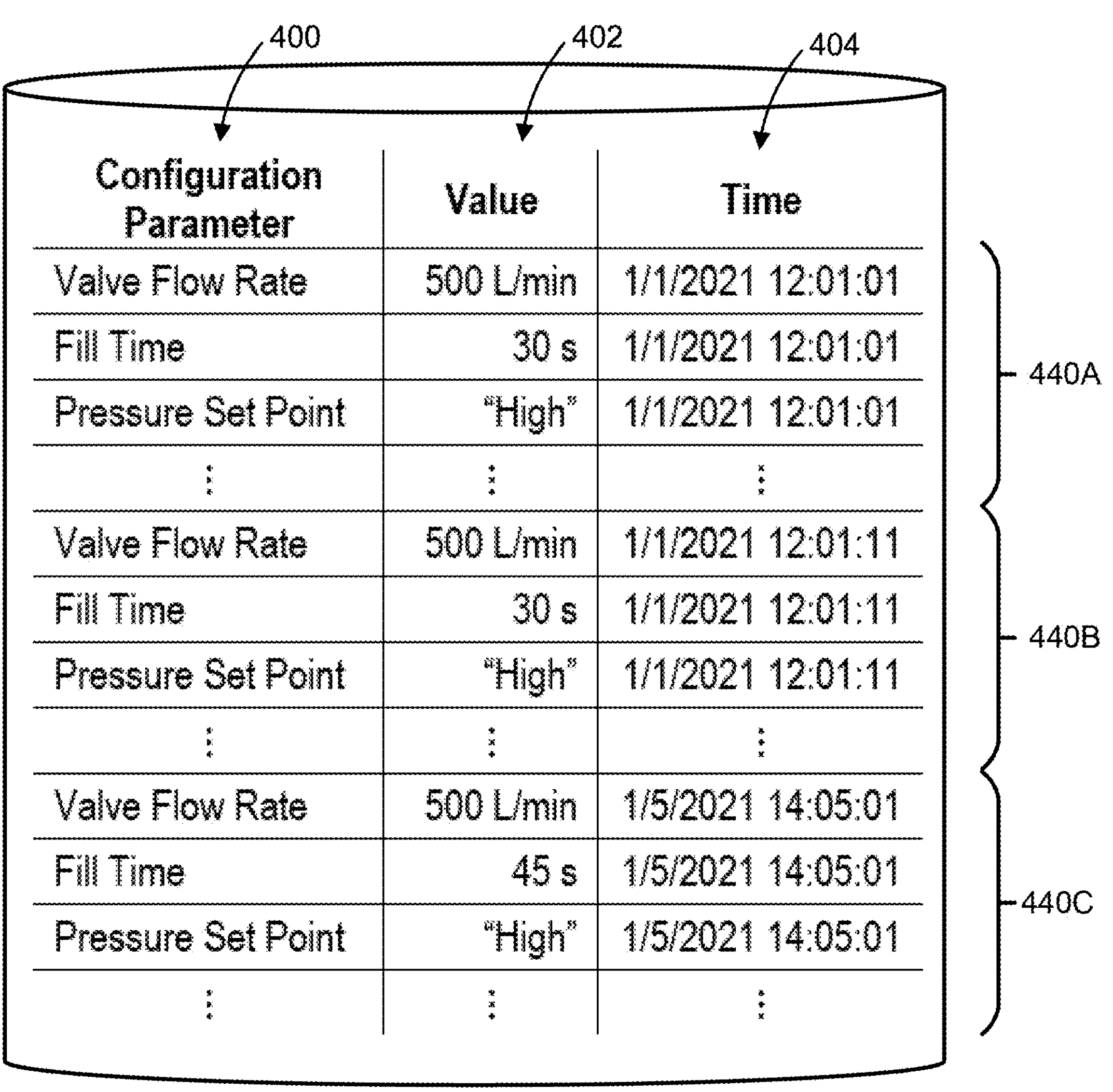
FIG. 4 is table of example configuration parameter values that can be stored by the configuration evaluation system shown in FIG. 1, in accordance with an embodiment.

At 210, the processor 112 can store a plurality of configuration parameter values (i.e., corresponding to the configuration parameters identified at 208). For example, FIG. 4 shows a plurality of configuration parameters 400 that can be stored by the processor 112. As shown, the processor 112 can store each configuration parameter value 402 in association with a timestamp 404 corresponding to a time associated with that configuration parameter value. In the illustrated example, a plurality of first configuration parameter values 440A is stored in association with a first timestamp corresponding to the first time (i.e., 1/1/2021 12:01:01). As shown, the plurality of first configuration parameter values 440A can include, for each configuration parameter 400, a corresponding first parameter value 310A. Additionally, or alternatively, the processor 112 can store a plurality of second configuration parameter values 440B in association with a second timestamp corresponding to the second time (i.e., 1/1/2021 12:01:11). As shown, the plurality of second configuration parameter values 440B can include, for each configuration parameter 400, a corresponding second parameter value 310B.

The processor 112 can also obtain subsequent parameter values from the PLC 122 and store subsequent configuration parameter values in association with a subsequent timestamp. For example, FIG. 4 shows a plurality of third configuration parameter values 440C that can be stored by the processor 112 in association with a third timestamp corresponding to a third time (i.e., 1/5/2021 14:05:01). The third configuration parameter values can correspond to a plurality of third parameters stored at the PLC 122 at the third time. As shown, the plurality of third configuration parameter values 440C include, for each configuration parameter 400, a corresponding third parameter value.

Figure 5:
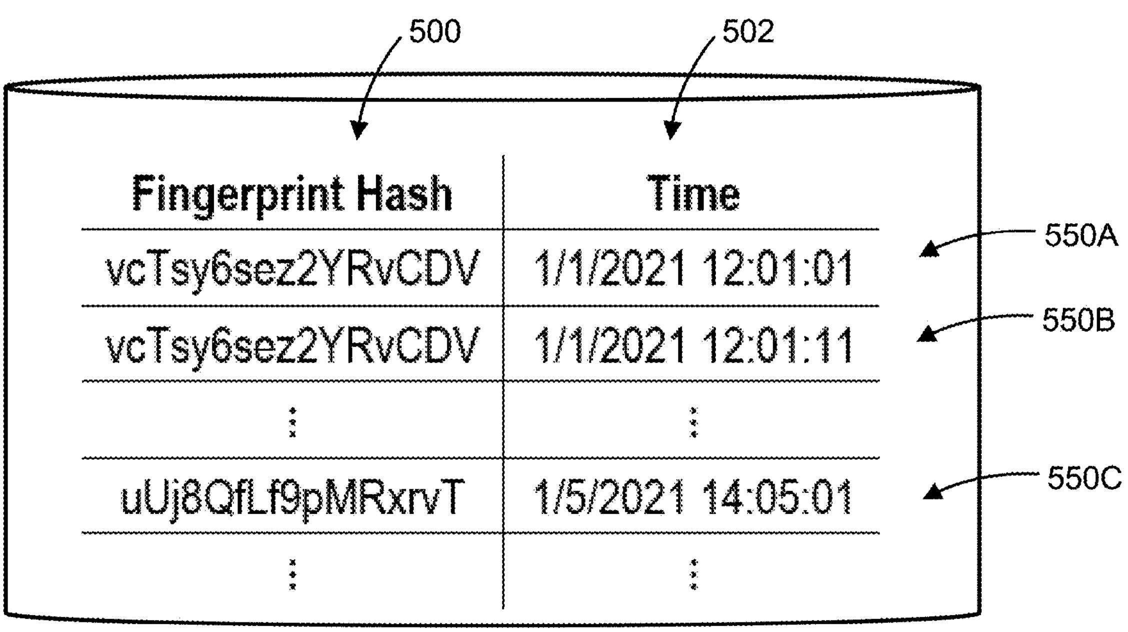
FIG. 5 is a table of example hashes of configuration parameter values that can be stored by the configuration evaluation system shown in FIG. 1, in accordance with an embodiment.

In some embodiments, the processor 112 can generate and store hashes of the configuration parameter values. For example, FIG. 5 shows example hashes 500 that can be generated and stored by the processor 112. As shown, each hash 500 can be stored in association with a timestamp 502 corresponding to the time associated with the corresponding configuration parameter values. In the illustrated example, a first hash 550A represents the plurality of first configuration parameter values 440A, a second hash 550B represents the plurality of second configuration parameter values 440B, and a third hash 550C represents the plurality of third configuration parameter values 440C. As shown, the first and second hashes 550A, 550B have the same hash value because the plurality of first configuration parameter values 440A and the plurality of second configuration parameter values 440B are the same. However, the third hash 550C has a different hash value as compared to the first and second hashes 550A, 550B because the plurality of third configuration parameter values 440C differs from the plurality of first configuration parameter values 440A and the plurality of second configuration parameter values 440B. The processor 112 can use any suitable hash function to map the configuration parameter values to hash values. The hash function can be selected to minimize collisions such that the same configuration parameter values map to the same hash values, and different configuration parameter values map to different hash values. The hash values can be stored in addition to or as an alternative to the configuration parameter values.

Each set of configuration parameter values or hashes stored in association with a timestamp can provide a "snapshot" or "fingerprint" of the configuration state of the machine 124 at a given time. The timestamped record of configuration parameter values can be used as a timeline to audit or detect changes in the configuration parameters, to correlate changes in the performance of the machines 124 to changes in the configuration parameters, to roll back or revert configuration parameters at a PLC 122, or to apply different configuration parameter values at the PLC 122. Storing configuration parameter values (or hashes thereof), rather than all of the parameter values can greatly reduce the amount of computer resources used to store and evaluate the parameters. In some cases, the configuration parameter values or hashes may be stored using a database, such as a relational database. For example, they may be stored using a Structured Query Language (SQL) or document database.

The stored configuration parameter values or hashes can be used in a variety of ways. In some embodiments, the processor 112 can use the stored configuration parameter values or hashes to detect changes in the configuration parameters at the PLC 122. For example, in the example illustrated in FIG. 4, the processor 112 may determine one or more configuration parameter value differences between corresponding configuration parameter values 402 in the plurality of first configuration parameter values 440A and the plurality of third configuration parameter values 440C. For instance, the processor 112 may detect that the fill time configuration parameter has changed from 30 s to 45 s.

The processor 112 can perform various actions in response to determining the one or more configuration parameter value differences. For example, the processor 112 can generate an alert indicating the one or more configuration parameter value differences. For example, the processor 112 may generate an alert warning a manufacturing line operator that the fill time configuration parameter has changed from 30 s to 45 s. This can notify the manufacturing line operator to the change in configuration parameter value, and therefore the configuration of the machine 124, and allow the manufacturing line operator to remedy the configuration if needed. Additionally, or alternatively, the processor 112 may modify a value of one or more parameters stored at the PLC 122. For example, the processor 112 may automatically "roll-back" or undo the change in the configuration parameter value based on previous configuration parameter values. For instance, in the example illustrated in FIG. 4, the processor 122 can modify a value of one or more parameters stored at the PLC 122 based on the plurality of first configuration parameter values 440A. This may allow the configuration evaluation system 110 to fix configurations of the machine 124 that may be undesirable or even harmful.

In some embodiments, the processor 112 can use the configuration parameter values to predict changes in the performance of the machine 124 or the manufacturing line 120. For example, the processor 112 may use one or more machine learned models to determine the predicted performance changes based on the configuration parameter values. The models can be any suitable artificial intelligence (AI) models that are trained to make such predictions. Various types of training methods may be used to generate the models, such as support vector machines, linear regression, logistic regression, naïve Bayes, linear discriminant analysis, decision trees, k-nearest neighbor algorithms, neural networks, similarity learning, polynomials with ridge estimators, polynomial with linear estimators, and the like. The training may be supervised or unsupervised. Additionally, or alternatively, the processor 112 may train one or more machine learned models based on performance data associated with the machine 124 and/or the manufacturing line 120 and the configuration parameter values. These predictions may be more accurate than the typical intuition of a manufacturing line operator.

In some cases, the processor 112 can modify a value of one or more parameters stored at the PLC 122 based on predicted performance changes. In this manner, the processor 112 can provide an "adaptive controller" that automatically adjusts the configuration parameter values of the PLC 122 to configure the machine 124. In other words, the configuration evaluation system 110 can monitor, adapt, and control the configuration of the machines 124 based on the parameters at the PLCs 122. The predictions can also be used to determine optimal settings for the machines 124, or to correlate performance of the machine 124 to parameter changes. The predictions may also take into consideration other data, such as environmental condition measurements.

Although the above examples have generally been described with regard to a single PLC 122 controlling a single machine 124 for ease of exposition, it should be appreciated that the configuration evaluation system 110 can be used to track, evaluate and control any number of PLCs 122 and machines 124. For example, the configuration evaluation system 110 may be used to monitor multiple machines 124 controlled by the same PLC 122. The configuration evaluation system 110 can also be used to monitor multiple machines 124 across multiple manufacturing lines 120. For example, the configuration evaluation system 110 may be used to compare the configurations and performance of the same model of machine 124 in different manufacturing lines 120.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device.

The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for evaluating configuration changes on a machine in a manufacturing line, the machine being controlled by a programmable logic controller (PLC), the PLC storing a plurality of parameters associated with the machine, the method comprising operating one or more processors to:

obtain, from the PLC, a plurality of first parameter values corresponding to the plurality of parameters stored at the PLC at a first time;

obtain, from the PLC, a plurality of second parameter values corresponding to the plurality of parameters stored at the PLC at a second time;

determine a plurality of parameter value differences, the plurality of parameter value differences comprising, for each parameter, a difference between the first and second parameter values corresponding to that parameter;

identify a subset of configuration parameters from the plurality of parameters based on the plurality of parameter value differences, each configuration parameter corresponding to a user-manipulatable parameter associated with controlling the machine;

generate a first hash based on the configuration parameter values, the first hash providing a fingerprint of a configuration state of the machine at the first time;

store the first hash in association with a first timestamp corresponding to the first time;

generate a subsequent hash based on a plurality of subsequent configuration parameter values obtained by the PLC at a subsequent time;

determine one or more configuration parameter value differences by comparing the first hash and the subsequent hash; and in response to the first hash and the subsequent hash being different, automatically modify a value of one or more configuration parameters stored at the PLC to revert the one or more configuration parameters to configuration parameter values corresponding to the first time, thereby adjusting the operation of the machine.

2. The method of claim 1, wherein identifying the plurality of configuration parameters comprises:

identifying a plurality of parameter value differences less than a predetermined difference threshold; and identifying a plurality of parameters corresponding to the parameter value differences less than the predetermined difference threshold as the plurality of configuration parameters.

3. The method of claim 1, further comprising operating the one or more processors to:

identify a plurality of environmental parameters from the plurality of parameters based on the plurality of parameter value differences, each environmental parameter corresponding to a non-user-manipulatable parameter associated with monitoring the machine.

4. The method of claim 1, further comprising operating the one or more processors to:

store, in a database, a plurality of hashes corresponding to a plurality of timestamps, thereby providing a timeline of configuration states of the machine.

5. The method of claim 1, further comprising operating the one or more processors to:

obtain, from the PLC, a plurality of third parameter values corresponding to the plurality of parameters stored at the PLC at a third time; and store a plurality of third configuration parameter values in association with a third timestamp corresponding to the third time, the plurality of third configuration parameter values comprising, for each configuration parameter, a corresponding third parameter value.

6. The method of claim 1, further comprising operating the one or more processors to:

in response to determining the one or more configuration parameter value differences, generate an alert indicating the one or more configuration parameter value differences.

7. The method of claim 1, further comprising operating the one or more processors to:

determine, using one or more machine learned models, a predicted performance change of the machine based on one or more of the plurality of first configuration parameter values.

8. The method of claim 7, further comprising operating the one or more processors to:

modify a value of one or more parameters stored at the PLC based on the predicted performance change.

9. The method of claim 1, further comprising operating the one or more processors to:

train one or more machine learned models based on performance data associated with one or more of the plurality of first configuration parameter values and at least one of the machine or the manufacturing line.

10. The method of claim 1, wherein the plurality of second parameter values is obtained from the PLC subsequent to obtaining the plurality of first parameter values.

11. A system for evaluating configuration changes on a machine in a manufacturing line, the machine being controlled by a programmable logic controller (PLC), the PLC storing a plurality of parameters associated with the machine, the system comprising:

one or more storage devices; and one or more processors in electronic communication with the PLC and the one or more storage devices, the one or more processors operable to:

obtain, from the PLC, a plurality of first parameter values corresponding to the plurality of parameters stored at the PLC at a first time;

obtain, from the PLC, a plurality of second parameter values corresponding to the plurality of parameters stored at the PLC at a second time;

determine a plurality of parameter value differences, the plurality of parameter value differences comprising, for each parameter, a difference between the first and second parameter values corresponding to that parameter;

identify a subset of configuration parameters from the plurality of parameters based on the plurality of parameter value differences, each configuration parameter corresponding to a user-manipulatable parameter associated with controlling the machine;

generate a first hash based on the configuration parameter values, the first hash providing a fingerprint of a configuration state of the machine at the first time;

store, at the one or more storage devices, the first hash in association with a first timestamp corresponding to the first time, generate a subsequent bash based on a plurality of subsequent configuration parameter values obtained by the PLC at a subsequent time;

determine one or more configuration parameter value differences by comparing the first hash and the subsequent hash; and in response to the first hash and the subsequent hash being different, automatically modify a value of one or more configuration parameters stored at the PLC to revert the one or more configuration parameters to configuration parameter values corresponding to the first time, thereby adjusting the operation of the machine.

12. The system of claim 11, wherein identifying the plurality of configuration parameters comprises:

identifying a plurality of parameter value differences less than a predetermined difference threshold; and identifying a plurality of parameters corresponding to the parameter value differences less than the predetermined difference threshold as the plurality of configuration parameters.

13. The system of claim 11, wherein one or more processors are further operable to:

identify a plurality of environmental parameters from the plurality of parameters based on the plurality of parameter value differences, each environmental parameter corresponding to a non-user-manipulatable parameter associated with monitoring the machine.

14. The system of claim 11, wherein the one or more processors are further operable to:

store, in a database, a plurality of hashes corresponding to a plurality of timestamps, thereby providing a timeline of configuration states of the machine.

15. The system of claim 11, wherein the one or more processors are further operable to:

obtain, from the PLC, a plurality of third parameter values corresponding to the plurality of parameters stored at the PLC at a third time; and store, at the one or more storage devices, a plurality of third configuration parameter values in association with a third timestamp corresponding to the third time, the plurality of third configuration parameter values comprising, for each configuration parameter, a corresponding third parameter value.

16. The system of claim 11, wherein one or more processors are further operable to:

in response to determining the one or more configuration parameter value differences, generate an alert indicating the one or more configuration parameter value differences.

17. The system of claim 11, wherein the one or more processors are further operable to:

determine, using one or more machine learned models, a predicted performance change of the machine based on one or more of the plurality of first configuration parameter values.

18. The system of claim 17, wherein the one or more processors are further operable to:

modify a value of one or more parameters stored at the PLC based on the predicted performance change.

19. The system of claim 11, wherein the one or more processors are further operable to:

train one or more machine learned models based on performance data associated with one or more of the plurality of first configuration parameter values and at least one of the machine or the manufacturing line.

20. The system of claim 11, wherein the plurality of second parameter values is obtained from the PLC subsequent to obtaining the plurality of first parameter values.

* * * * *